United States Patent [19]

Harvalik

[11] 3,965,751

[45] June 29, 1976

[54] INTEGRATED MAGNETO-SEISMIC SENSOR

[76] Inventor: Zaboj V. Harvalik, 5901 River Drive, Lorton, Va. 22079

[22] Filed: Nov. 8, 1974

[21] Appl. No.: 522,167

[52] U.S. Cl. .............................. 73/432 R; 73/71.2; 340/38 L; 340/258 D
[51] Int. Cl.² .................... G01D 7/02; G01D 21/04
[58] Field of Search ............... 73/70.2, 71.2, 517 R, 73/432 R; 340/38 R, 38 L, 261, 258 D

[56] References Cited
UNITED STATES PATENTS

| | | | |
|---|---|---|---|
| 1,948,104 | 2/1934 | Firestone et al. ................. | 73/70.2 X |
| 2,429,094 | 10/1947 | Kent et al. ........................... | 73/70.2 |
| 2,707,776 | 5/1955 | Cruzan ............................... | 73/71.2 X |
| 3,754,223 | 8/1973 | Shtrikman ......................... | 340/38 L |
| 3,754,225 | 8/1973 | Gleason ............................ | 73/71.2 X |
| 3,846,790 | 11/1974 | Erdman et al. ................. | 340/258 D |

Primary Examiner—James J. Gill
Attorney, Agent, or Firm—Nathan Edelberg

[57] ABSTRACT

To detect and discriminate by magnetic and seismic means any metallic intruding object, sensors are emplaced in areas into which the object to be detected and identified is expected to enter. In prior like sensors, separate magnetic and seismic sensors were used. The subject invention combines the magnetic and seismic sensing functions into an integrated device, the common structure of which is sensitive to magnetic and seismic signatures simultaneously.

4 Claims, 6 Drawing Figures

INTEGRATED MAGNETO-SEISMIC SENSOR

GOVERNMENT USE

The invention described herein may be manufactured and used by or for the government of the United States of America for governmental purposes without payment to me of any royalties thereon.

FIELD OF THE INVENTION

The subject invention is in the field of sensors which detect seismic and magnetic disturbances. Heretofore, individual categories of sensors have been used, whereas this invention presents the original combination of both functions in a single structure. The pick-up coil serves as the detector of the seismic as well as the magnetic disturbances.

DESCRIPTION OF THE PRIOR ART

No prior art is known by this inventor for the combination of seismic and magnetic sensors into a single integrated structure as taught by this invention.

SUMMARY

In the art of sensors, there has long been a need for detection of both seismic and magnetic disturbances simultaneously. Further, evidence of the presence of implanted sensors needed to be minimized, false signals were to be reduced in number, and improved correlation among signal types was a requirement. Identification of the cause of the disturbances was not available. Discernment of the disturbing device is greatly increased by having the magnetic and seismic signals come from the same location. The sensor output signals convey orders of magnitude of improvement in the intelligence in representing the true disturbing influence. By the utilization of electromagnetic induction to produce an electric current in a pickup coil when changes of the ambient magnetic flux occur, and by providing an inertial mass suspended on a ferromagnetic reed, this invention combines the advantages of both magnetic and seismic sensors into unified structure. An unexpected result is the doubling of the magnetic portion of the output signal by the unique structural relationships of this invention. The two air gaps provide this unique invention.

Thus, by this invention, it is for the first time possible to easily correlate the magnetic and seismic signals for location and identification of the cause of magnetic and seismic disturbances. In contradistinction of separate magnetic and seismic emplacement to the instant combined sensor, the location of the sensor of this invention is much easier to determine, thus permitting an easier correlation of both signals for locating and identifying the disturbing structures. Another use of the dual sensor could be the incorporation into a more sophisticated land or sea mine activation system utilizing a predetermined threshold output of magnetic and seismic signals to detonate such mine. Further, the sensor is useful in submarine detection and for monitoring surface vessel movements, especially in narrow channels. Also, a damping element enables the instant sensor to be emplaced without precise orientation, precluding the necessity for accurately vertical alignment when emplaced.

It is, therefore, an object of this invention to provide a sensor including both seismic and magnetic disturbance detection.

Another object of this invention is to minimize traces of sensor emplacement since one half the number of sensors is needed.

Still another object of this invention is to provide improved correlation among signal types to make available positive location and identification of the intruding object.

A still further object of this invention is to provide both seismic and magnetic sensors at the same location.

Yet another object of this invention is to provide a greatly increased capability for discernment of the disturbing object.

Another object of this invention is to provide a combined sensor which utilizes the structure of a first sensor of a first disturbance or variation to become a sensor of a second distinct variation by the addition of a single element in operative cooperation with the first sensor.

The exact nature of this invention as well as other objects and advantages thereof will be readily apparent from consideration of the following specification relating to the annexed drawings in which:

DESCRIPTION OF A PREFERRED EMBODIMENT

Figure 1:
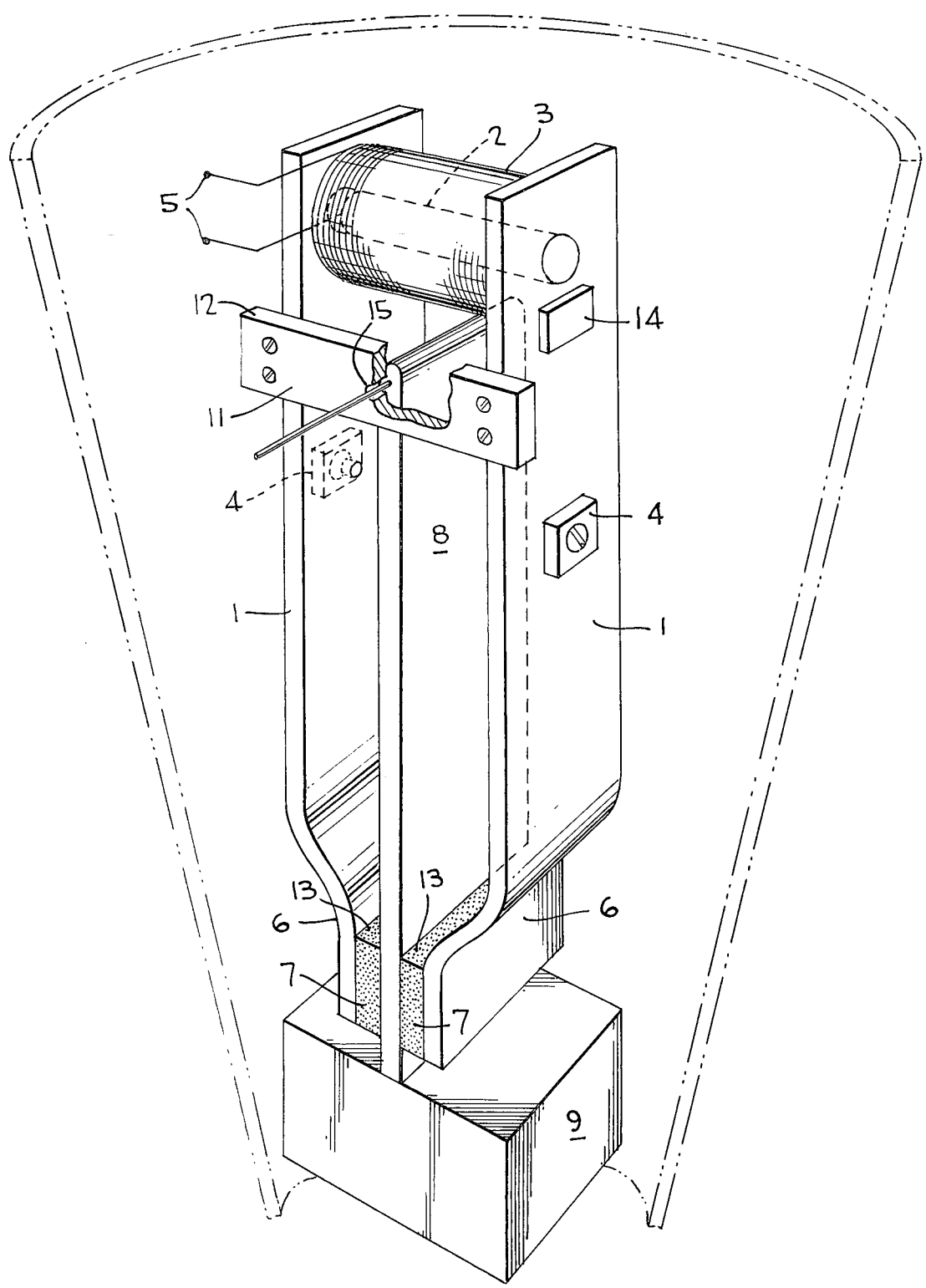
FIG. 1 shows the structure of the combined sensor of this invention.

Turning now to the drawings, FIG. 1 shows the combined sensor of this invention.

The magnetic system consists of an armature yoke of substantially tuning fork configuration in some realizations composed of two tines 1 and a bight 2 which is the core for a pick-up coil 3. Tines 1 are rigidly connected to a casing made of non-magnetic material, such as plastic or aluminum. The casing entirely surrounds the sensor and, the tines 1 of the sensor are rigidly connected to the casing by a suitable securing means 4 on each of tines 1. The output of coil 3 is connected to output terminals 5 which are the junctions at which the usable intelligence generated by this sensor is available. The ends of tines 1 that are remote from bight 2 are configured to form opposed parallel pole shoes 6. These pole shows provide an air gap 7 in the magnetic path through the armature. The armature yoke with tines 1 and bight 2 are made of Permalloy-type of high initial permeability material and acts as a magnetic dipole-concentrator. This system constitutes a magnetometer reacting to changes in the magnetic field surrounding the armature. As the field changes, a voltage is induced in the pick-up coil 3. Terminals 5 can be connected to an amplifier and the amplified signal can be transmitted by radio or wire to a display or other terminal utilizing such information. The change of the magnetic field caused by a passing vehicle, for example, is slow; perhaps not in excess of one Hertz.

The seismic system utilizes the armature of the magnetic system and associated pick-up coil 3. The structure added for the seismic function is a reed or tine 8 of magnetic material of the type used in the armature of the magnetic system. A large inertial mass 9 is attached or integral with one end of reed 8. A reed supporting member 11 is secured on one edge of each of the tines 1 spanning such edges of tines and situated as close to coil 3 as practicable in order to assure the maximum length for reed 8. Supporting member 11 has extensions 12 along its length which protrude beyond tines 1 to serve as a means for tightly fitting the casing and adding to the rigid connection of the armature and the casing undertaken by securing means 4. Reed 8 is pivotally mounted on supporting member 11 by suspension means 15 if element 8 is a tine, or is rigidly secured if element 8 is a vibratory reed. The preferred vibratory reed is subject to less damage during emplacement. However, a tine can be readily substituted when specifically required. Read 8 is suspended from suspension means 15 such that it extends between the pole shoes 6 of the armature and inertial mass 9 is on the opposite side of the pole shoes 6 from the non-magnetic (non-ferrous generally) securing means or supporting member 11. The length of reed 8 and the weight of the inertial mass 9 are determined by the sensitivity required to respond to seismic disturbances selected to be detected. The reed 8 is free to move between pole shoes 6 to induce changes in the magnetic flux concentrations in the air gap there between. Damping means 13 are inserted between reed 8 and pole shoes 6, in air gap 7, so as to prevent the reed from resting against a pole shoe, thereby losing its capability to vibrate freely, in the event that the sensor is emplaced in the earth in any attitude other than having the reed in a vertical position.

OPERATION OF A PREFERRED EMBODIMENT

Figure 2:
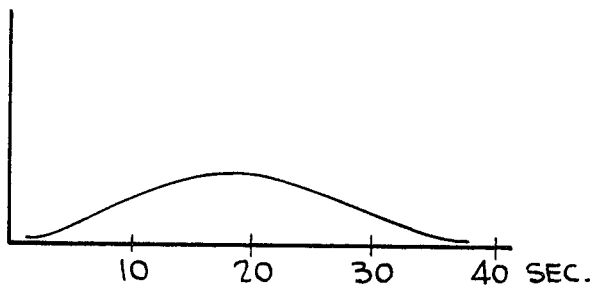
FIG. 2 shows the output wave form from a single magnetic sensor of the prior art.

The magnetic sensor system operates by the disturbance of the magnetic flux in the air gap between pole shoes 6. Such disturbance is transmitted through armature yoke tines 1 to coil 2 where the flux changes that are produced thereby are effective to induce a signal voltage in pick-up coil 3 and available as the output signals at terminals 5. The wave form illustrated in FIG. 2 is a sample signal produced by the magnetic sensor of this invention without the seismic signal combined therewith. FIG. 2 also illustrates the output signal of the magnetic sensors of the prior art.

Figure 3:
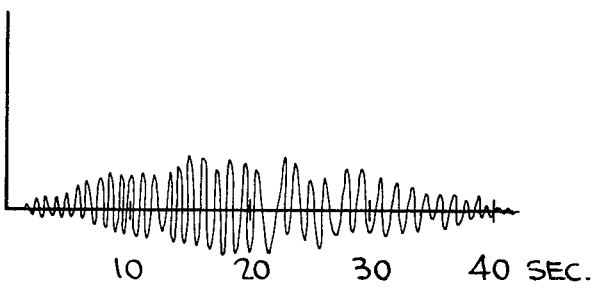
FIG. 3 shows the output wave form from a single seismic sensor of the prior art.

The seismic sensor system also operates by responding to the disturbances in the flux between pole shoes 6. However, the seismic output signal is generated by the changes of distance between pole shoes 6, which are effectively integral with the seismic environment, with respect to the inertial mass 9, which is effectively free from any influence by the seismic environment. Such changes induce a magnetic flux response and produce a seismic signal at terminals 5 in the same manner as the magnetic sensing signal is produced. FIG. 3 illustrates a wave form produced by the seismic sensor of this invention without the magnetic signal combined therewith. FIG. 3 also illustrates the output signal of the seismic sensors of the prior art.

Figure 4:
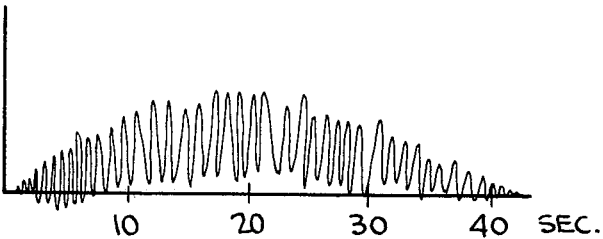
FIG. 4 shows a sample of the output of the combined sensor of this invention.
Figure 5:
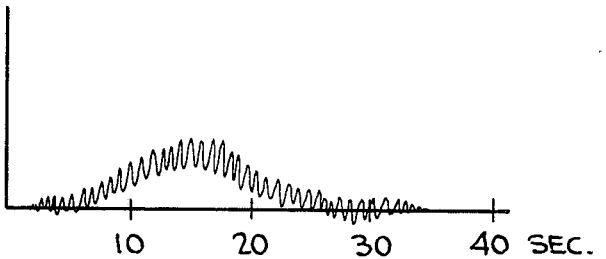
FIG. 5 shows a typical signature of a wheeled vehicle as identified in the output signal of the combined sensor of this invention.
Figure 6:
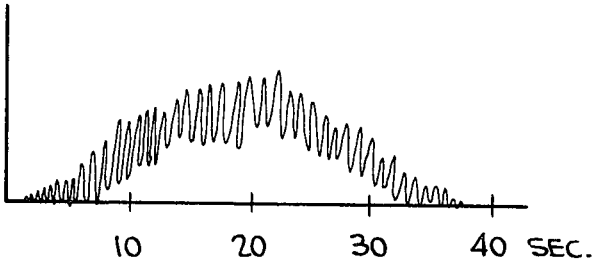
FIG. 6 shows a typical signature of a tracked vehicle as identified in the output signal of the combined sensor of this invention.

In actual operation of this invention, the magnetic and seismic sensing are simultaneous. FIG. 4 illustrates the wave form generated by a typical sensed object with the magnetic and seismic signals combined to reveal intelligence not available from the prior art. FIG. 5, for example, shows a typical combined signal as it would be generated by a wheeled vehicle, the signal having a distinct wheeled vehicle signature. FIG. 6 shows the signal generated by a typical tracked vehicle, revealing still another distinct signature. The two signatures are distinct in that the signal for the tracked vehicle shows a longer duration and higher amplitude of seismic disturbance, as well as a stronger magnetic disturbance, compared to the wheeled disturbances. The ratio of peak seismic to magnetic amplitude is higher in the case of the tracked vehicle.

Core 2, armature yoke with tines 1 and pole shoes 6, reed 8 and air gaps 7 through damping cushions 13, constitute a magnetic circuit, magnetized by the ambient geomagnetic field. Cushions 13 are of foam plastic, sponge rubber, or the like, so as to keep reed 8 from hitting pole shoes 6 while still providing air gap characteristics between the pole shoes and the reed. A small permanent magnet 14 may be attached to the armature yoke to polarize and slightly magnetize the magnetic circuit should the ambient geomagnetic field be too weak for proper seismic sensing. If the armature is moved or vibrated, the high-inertia reed will remain at rest with the result that the relative motive between the reed and the armature system induces a voltage in the pick-up coil. Since the vibrations which change the position of the reed with respect to the armature poles are of frequencies above 1 Hertz, the output of the pick-up coil will show a voltage change corresponding to the frequency of the vibrations. This voltage could be amplified and displayed together with the one originating from the magnetic sensor part of the sensor. Thus, the pick-up coil may produce a low-frequency, up to 1 Hertz, signal indicating a magnetic disturbance and a high-frequency, 5 to 100 Hertz, signal indicating a seismic signal. The introduction of low and high pass filters could accentuate the frequency spectrum and thus the source of the disturbance.

The suspending ribbon 8 can have a 90 degree twist along its longest axis.

So it is seen that I have provided a unique sensor combining the magnetic and seismic sensing in one structure capable of sensing a disturbing influence and of discerning the type of vehicle intruding into the sphere of influence of the sensor.

Obviously many modifications and variations of the present invention are possible in the light of the above teachings. It is, therefore, to be understood that within the scope of the appended claims, the invention may be practiced otherwise than as specifically described.

What is claimed is:

1. An integrated sensor assembly for the detection of intrusion disturbances, of the variety having magnetic signal or seismic signal characteristics, when said sensor assembly is emplaced in a selected area comprising:
   an all encompassing casing of nonmagnetic material adapted for emplacement in seismic relation in a selected area,
   a magnetic armature yoke structure rigidly supported in seismic relation within said casing,
   said armature yoke structure having a magnetic path consisting of a first section, a second section, and a defined air gaps section between a first selected end of each of said first and second sections, and a third section connected to the opposite end of each of said first and second sections and disposed therebetween, said first, second, and third sections of said magnetic armature yoke being of a material having a high initial permeability, said third section having an inductance means wound thereabout such that changes in magnetic flux conditions in said air gaps section produces a first signal, having a frequency within a first selected frequency range, across said inductance means representative of said changes in magnetic flux conditions, and an elongated pendulum member, nonmagnetic means for pivotedly attaching said elongated pendulum member to said yoke structure in the vicinity of said third section thereof, the length and configuration of said pendulum member and the pivot connection of said means for attaching adapted such that said pendulum member extends through and beyond said air gaps section and, in at least one selected orientation of said casing, is pivotedly moveable within said air gaps section in response to seismic movement of said casing, at least that portion of said pendulum member within said air gaps section being of a material which creates a magnetic flux disturbance when said pendulum member moves relative to said first selected ends of said first and second sections of said yoke structure within said air gaps section and produces a second signal, having a frequency within a second selected frequency range, across said inductance means representative of the movement of said pendulum member.

2. An integrated sensor assembly as defined in claim 1 wherein said defined air gaps section is partially filled by damping means adapted and disposed to freely maintain said pendulum member in variable spaced relation with respect said first selected ends of said first and second sections of said yoke structure.

3. An integrated sensor assembly as defined in claim 2 wherein an inertial mass means is attached to said pendulum member beyond said air gaps section of said yoke structure.

4. An integrated sensor assembly as defined in claim 3 wherein a permanent magnet is attached to said armature yoke structure and is disposed to supplement the magnetic effect of the ambient geomagnetic field on said armature yoke structure.

* * * * *